United States Patent
Koop et al.

(10) Patent No.: US 11,754,164 B2
(45) Date of Patent: Sep. 12, 2023

(54) GEAR, GEARWHEEL PAIR, AND METHOD FOR PRODUCING A GEAR

(71) Applicant: IMS Gear SE & Co. KGaA, Donaueschingen (DE)

(72) Inventors: Matthias Koop, Donaueschingen (DE); Stephan Oberle, Villingen-Schwenningen (DE); Egor Melinkov, Titisee-Neustadt (DE); Eugen Stoppel, Muehlingen (DE); Sebastian Birk, Trossingen (DE)

(73) Assignee: IMS Gear SE & Co. KGaA, Donaueschingen (DE)

( * ) Notice: Subject to any disclaimer, the term of this patent is extended or adjusted under 35 U.S.C. 154(b) by 43 days.

(21) Appl. No.: 16/139,031

(22) Filed: Sep. 22, 2018

(65) Prior Publication Data

US 2019/0093748 A1   Mar. 28, 2019

(30) Foreign Application Priority Data

Sep. 25, 2017   (EP) .................................... 17193000

(51) Int. Cl.
*F16H 55/06*   (2006.01)
*F16H 55/17*   (2006.01)
(Continued)

(52) U.S. Cl.
CPC ......... *F16H 55/17* (2013.01); *B29C 37/0082* (2013.01); *B29C 45/0025* (2013.01);
(Continued)

(58) Field of Classification Search
CPC ............ F16H 1/08; F16H 55/06; B29D 15/00
(Continued)

(56) References Cited

U.S. PATENT DOCUMENTS

| 3,200,665 A | 8/1965 | Wells |
| 3,683,714 A | 8/1972 | Castellani |
| (Continued) | | |

FOREIGN PATENT DOCUMENTS

| CN | 101016944 | 8/2007 |
| CN | 103501977 | 1/2014 |
| (Continued) | | |

OTHER PUBLICATIONS

Ettemeyer et al., "Construction Elements," and English translation thereof, Fachhochschule München Faculty 06—Fine and Micro Engineering, Dated Mar. 1, 2007, document of 57 pages.

(Continued)

*Primary Examiner* — Randell J Krug
(74) *Attorney, Agent, or Firm* — Akerman LLP; Peter A. Chiabotti

(57) ABSTRACT

A gearwheel pair for a gear unit, comprising a first gear and a second gear, which can be meshed with one another, wherein the first gear consists entirely or partially of metal or plastic and the second spur gear comprises an outer part having a gear rim made of a first plastic and having a number of injection-molded portions, an inlay part made of metal, and a connecting part, which is arranged between the inlay part and the outer part and is made of a second plastic for the interlocked and/or materially-bonded connection of the inlay part and the outer part and further relates to the second spur gear per se, a gear unit having such a gearwheel pair, and a method for producing a second gear, which is used for such a gear unit.

15 Claims, 5 Drawing Sheets

(51) Int. Cl.

| | |
|---|---|
| *B29C 45/16* | (2006.01) |
| *B29C 37/00* | (2006.01) |
| *B29C 45/27* | (2006.01) |
| *F16H 55/02* | (2006.01) |
| *B29C 45/00* | (2006.01) |
| *F16H 1/08* | (2006.01) |
| *B29L 15/00* | (2006.01) |
| *B29C 45/14* | (2006.01) |
| *B29K 705/00* | (2006.01) |

(52) U.S. Cl.
CPC ...... *B29C 45/1657* (2013.01); *B29C 45/1671* (2013.01); *B29C 45/2708* (2013.01); *F16H 1/08* (2013.01); *F16H 55/02* (2013.01); *F16H 55/06* (2013.01); *B29C 45/1459* (2013.01); *B29C 45/14311* (2013.01); *B29C 2045/1682* (2013.01); *B29K 2705/00* (2013.01); *B29L 2015/003* (2013.01); *F16H 2055/065* (2013.01)

(58) Field of Classification Search
USPC .......................................... 74/458, DIG. 10
See application file for complete search history.

(56) References Cited

U.S. PATENT DOCUMENTS

| | | | | |
|---|---|---|---|---|
| 10,486,349 | B2* | 11/2019 | Nakamura | ............ B29C 45/162 |
| 2007/0049453 | A1* | 3/2007 | Nagai | ................ F16H 61/0295 |
| | | | | 475/254 |
| 2007/0086907 | A1 | 4/2007 | Oberle et al. | |
| 2007/0087617 | A1* | 4/2007 | Oberle | .................... F16H 55/06 |
| | | | | 439/395 |
| 2008/0146402 | A1* | 6/2008 | Shinohara | ............... F16H 55/06 |
| | | | | 475/331 |
| 2008/0289436 | A1* | 11/2008 | Laakkonen | ............... G01L 5/12 |
| | | | | 73/862.49 |
| 2013/0228028 | A1 | 9/2013 | Kim et al. | |
| 2014/0007724 | A1* | 1/2014 | Kim | ................... B29C 45/1671 |
| | | | | 74/434 |
| 2016/0016368 | A1* | 1/2016 | Kunishima | ............. F16H 55/06 |
| | | | | 74/434 |
| 2016/0047453 | A1* | 2/2016 | Oh | .......................... C08J 5/043 |
| | | | | 74/434 |
| 2017/0021807 | A1 | 1/2017 | Lassalle | |
| 2017/0095950 | A1 | 4/2017 | Brochot et al. | |
| 2017/0167589 | A1* | 6/2017 | Berlinger, Jr. | ...... F16H 55/0806 |
| 2019/0170236 | A1* | 6/2019 | Kleiss | .................... F16H 55/16 |

FOREIGN PATENT DOCUMENTS

| | | |
|---|---|---|
| CN | 103890459 | 6/2014 |
| CN | 104295700 | 1/2015 |
| DE | 10343400 | 4/2005 |
| DE | 102012102778 | 10/2013 |
| DE | 102012102780 | 10/2013 |
| EP | 1777439 | 4/2007 |
| JP | 2002333059 | 11/2002 |
| JP | 2017082858 | 5/2017 |
| KR | 101091067 | 12/2011 |

OTHER PUBLICATIONS

Friedemann, "28—Helically toothed profile-shifted gear range," and English translation thereof, dated Sep. 11, 2017, document of 47 pages.
European Patent Office, "European Search Report," issued in European patent application No. 17 193000.1, dated Jun. 6, 2018, document of 22 pages.
Wikipedia, "Engineering plastics," and English translation thereof, dated Jun. 2, 2020, document of 4 pages.
Nigel, "Crystalline and Amorphous Polymers," Mallard Creek Polymers, dated Jul. 14, 2017, document of 5 pages.
The State Intellectual Property Office of People's Republic of China, "First Office Action," and English language translation thereof, issued in Chinese patent application No. 201811116039.4, dated Jun. 23, 2021, document of 18 pages.
Korean Intellectual Property Office, "Office Action," and English language translation thereof, issued in Korean patent application No. 10-2021-0080768, dated Oct. 20, 2022, document of 11 pages.

* cited by examiner

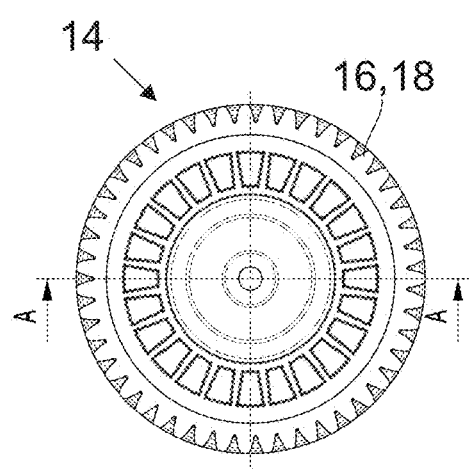
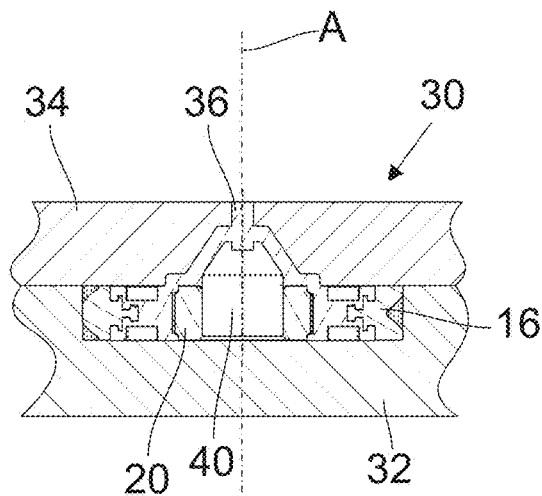
Fig.7a  Fig.7b
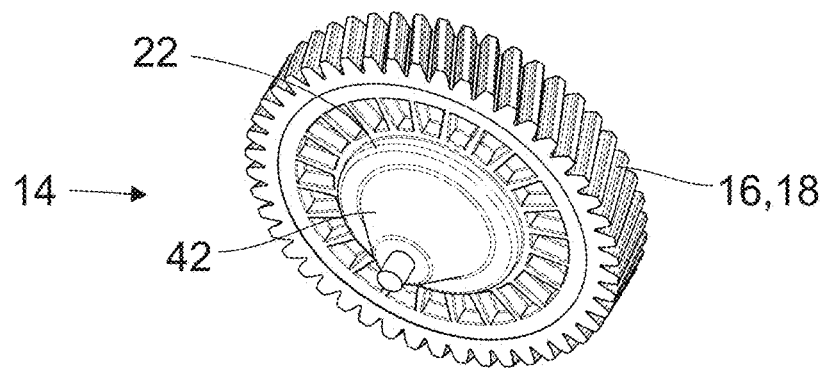
Fig.7c
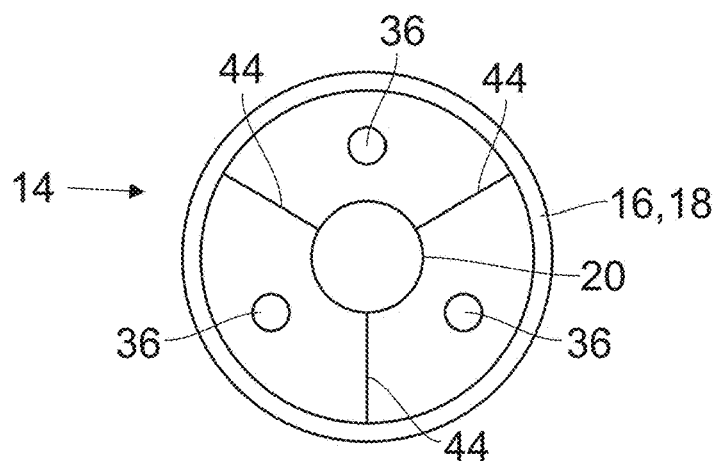
Fig.8

GEAR, GEARWHEEL PAIR, AND METHOD FOR PRODUCING A GEAR

CROSS REFERENCE TO RELATED APPLICATIONS

This application claims priority to European Patent Application No. 17 193000.1, filed Sep. 25, 2017, which is incorporated by reference in its entirety.

BACKGROUND

The present application relates to a spur gear for use in a spur gear unit, a gearwheel pair for a spur gear unit, a spur gear unit having such a gearwheel pair, and methods for producing a spur gear, which is used for such a spur gear unit.

SUMMARY

Spur gear units represent a widespread design of gear units, which have a comparatively simple construction. In comparison to planetary gear units, ring gears are not necessary, which require a higher manufacturing expenditure. In comparison to worm gears, the construction is simpler because no worm wheels and worms, which are relatively complex to manufacture, are necessary.

The spur gears of the gearwheel pairs of spur gear units, which are subjected to high mechanical loads and large temperature variations, are typically manufactured from metal. Temperature variations can act, for example, on the spur gear unit when the spur gear unit is arranged in the vicinity of an internal combustion engine of a vehicle. However, a relatively high level of noise development, which is perceived to be disadvantageous, occurs in operation of the spur gear unit due to the use of metal.

The noise development can be reduced in that at least one spur gear of the gearwheel pair is manufactured from plastic, whereby the further advantage of weight reduction can be achieved. Such a spur gear unit is disclosed in DE 10 2010 006 306 A1. However, in the event of high mechanical loads and/or high temperatures, high levels of deformation accordingly occur in the spur gears, which results in engagement malfunctions and tension increases in the gearwheel pair. In addition to the use of plastic, the noise development may be reduced by means of a helical gearing. However, axial forces arise upon the use of helical gearings, whereby tilting torques are introduced into the spur gears. The tilting torques result in deformations of the spur gears and in wear pattern shifts, which result in increased wear and increased noise development.

Because of the high bandwidth of the mechanical loads and temperature variations, gearing corrections counteracting these deformations cannot be performed, since they are only expedient for certain operating states, in which the mechanical loads and the temperatures vary in relatively narrow limits. The gearing corrections can be counterproductive outside these limits.

The use of fiber-reinforced materials, which have increased stiffness, is generally not possible, since they induce increased wear and fiber abrasion on the teeth. A certain deformation in the circumferential direction is desirable to compensate for tooth shape errors, increase the profile overlap and overlap ratio in the event of elevated stress, and use the deformation for damping, which is only possible to a very limited extent using fiber-reinforced materials.

Spur gears made of plastic have increased thermal expansion in comparison to spur gears made of metal. An enlargement of the diameter of the spur gears of the gearwheel pair and a reduction of the flank play up to jamming thus occur at high temperatures. At low temperatures, the tooth clearance enlarges, which is also not desirable, since the profile overlap decreases in the case of such an enlarged tooth clearance and therefore the running becomes rougher.

The use of spur gears made of plastic in spur gear units for applications having high mechanical stress and large temperature variations is restricted to a few applications because of the above statements, where special and typically expensive plastics can be used. A use in mass production cannot be implemented because of technical and economic considerations.

A way out of this situation is described, for example, in DE 103 43 400 A1, which shows a starter gear which comprises a very large inlay part made of metal, referred to as a plate therein, and a gear rim made of plastic adjoining on the radial outside. The production of such a gearwheel is difficult for the following reasons, however: either the plastic melt is injected around the inlay part in the pinpoint gate method to produce the gear rim, whereby weld seams arise where the flow fronts encounter one another, which represent potential defined breaking points for the gear rim, which is under blocked shrinkage tension. Instead of the pinpoint gate method, a disk gate method can be used, whereby the gear rim is produced without weld seams from the center outward. However, the disk gate is also very large due to the very large inlay part, since the plastic melt has to be guided over a relatively large distance, whereby a large excess occurs that subsequently has to be removed, which results in additional production costs. A large amount of valuable material is lost in this way.

The object of one embodiment of the present disclosure is therefore to specify a spur gear for use in a spur gear unit and also a gearwheel pair for a spur gear unit, using which the above-mentioned disadvantages are remedied or at least reduced. In particular, a gearwheel and a gearwheel pair are to be specified, which, even in the event of high mechanical loads and large temperature variations, provides a low noise development and good engagement with little wear, wherein the gearwheel pair is also to be producible cost-effectively This object is achieved by the features and structures recited herein. Advantageous embodiments and further developments are also disclosed herein.

One embodiment of the present disclosure relates to a spur gear for use in a spur gear unit, comprising an outer part having a gear rim made of a first plastic and having a number of injection-molded portions, an inlay part made of metal, and a connecting part, which is arranged between the inlay part and the outer part and is made of a second plastic for the interlocked and/or materially-bonded connection of the inlay part and the outer part, wherein the injection-molded portions are overlapped by the connecting part.

In the scope of this description, a first plastic and a second plastic are to be understood as the following: The first plastic and the second plastic are to differ in the mechanical properties thereof in any case, but do not necessarily have to differ chemically. For example, one of the two plastics can be self-reinforced. To embody the plastic as self-reinforced, the molecular structure and/or the crystallinity of the plastic can be intentionally modified. In this way, in particular the tensile strength can be increased, without having to add further components. Alternatively or additionally, one of the two plastics can be fiber-reinforced, whereby the tensile strength can also be enhanced. As a result of these measures, the tensile strength of the plastic, which is the same considered chemically, can be increased by up to a factor of 5.

In spur gear units, the gearwheels are loaded both about their axis of rotation and also along their axis of rotation. The load along the axis of rotation, also referred to as axial load, occurs in particular when the gearwheel has a helical gearing. The gearwheel proposed here has a total of three parts, namely the outer part, the connecting part, and the inlay part. Precautions have to be taken at the transition between the three parts in order to ensure that the forces and torques can be transmitted without slipping of the three parts in relation to one another. The transition between the outer part and the connecting part is particularly critical. Since the outer part is produced from a different plastic than the connecting part, a materially-bonded connection can only be produced to a limited extent. In order to ensure a transmission of the forces and torques without slipping, depressions are provided, in which corresponding projections engage, and therefore an interlocked connection is provided between the outer part and the connecting part. As explained, the interlocked connection has to prevent slipping of the outer part and the connecting part in relation to one another both along the axis of rotation and also about the axis of rotation. The depressions and projections have to be formed accordingly. To prevent slipping both along and also about the axis of rotation, undercuts arise at least on one part, and therefore the relevant part cannot be molded, in particular cannot be injection molded, without gates, which makes the injection molding procedure complex and thus costly.

To nonetheless be able to produce the proposed spur gear cost-effectively, firstly the outer part is molded, which has a number of depressions, which can be delimited radially inward. The depressions can also be embodied as boreholes and can be formed such that no undercuts result and therefore no gates are required during the injection molding procedure.

Subsequently, the connecting part is injection-molded between the outer part and the inlay part, wherein the outer part is used as a shaping element in particular for the projections of the connecting part. Since the outer part and the connecting part are to be connected to one another in any case, demolding is not necessary, because of which gates are not required, even if the projections of the connecting part result in undercuts. The proposed spur gear can therefore be produced cost-effectively.

Because of the fact that the outer part is injection molded, it has a number of injection-molded portions. Injection-molded portions are to be understood hereafter as portions on the surface and/or in the vicinity of the surface of the finished outer part, which have differing properties from the remaining outer part as a result of the injection molding method used. Injection-molded portions can occur, for example, in the form of injection-molded surfaces, in which the outer part has a surface quality modified in relation to the other surfaces. Injection-molded portions can also occur in the form of injection-molded points, in which the texture of the plastic differs from that of the remaining component. As already stated, the connecting part is injected between the outer part and the inlay part. This presumes that firstly the outer part and thereafter the connecting part are injected. According to the proposal, the injection-molded portions of the outer part are placed such that they are overlapped by the connecting part in the finished spur gear. The proposed arrangement of the injection-molded portions of the outer part results in a good distribution of the liquefied first plastic during the production of the outer part, whereby the outer part can be manufactured very homogeneously and the formation of cavities and vacuoles can be avoided.

According to a further embodiment of a spur gear for use in a spur gear unit, the spur gear comprises an outer part having a gear rim made of a first plastic, an inlay part made of metal, and a connecting part, which is arranged between the inlay part and the outer part and is made of a second plastic for the interlocked and/or materially-bonded connection of the inlay part and outer part, wherein the connecting part has undercuts at least along an axis of rotation of the spur gear. The axis of rotation of the spur gear is to be understood as the axis about which the spur gear rotates in operation in a spur gear unit. The inlay part and the outer part are arranged concentrically to the axis of rotation of the connecting part. The undercuts formed along the axis of rotation have the result that the molds of the injection-molding tool cannot be opened without the use of gates along the axis of rotation.

To nonetheless be able to produce the proposed spur gear cost-effectively, firstly the outer part is molded, which has a number of depressions, which are delimited radially inward. The depressions can also be embodied as boreholes and can be designed such that no undercuts arise and therefore no gates are required during the injection-molding procedure.

The connecting part is subsequently injected between the outer part and the inlay part, wherein the outer part is used as a shaping element in particular for the projections of the connecting part. As already mentioned, the outer part and the connecting part have to be connected to one another in any case. Demolding is therefore not necessary, because of which no gates are required, even if the projections of the connecting part form undercuts.

In the proposed spur gear, the connecting part can have the undercuts and the injection-molded portions of the outer part can be concealed by the connecting part.

One embodiment of the present disclosure relates to a gearwheel pair for a spur gear unit, comprising a first spur gear and a second spur gear, which can be meshed with one another, wherein the first spur gear consists entirely or partially of metal or plastic and the second spur gear comprises an outer part having a gear rim made of a first plastic and having a number of injection-molded portions, an inlay part made of metal, and a connecting part, which is arranged between the inlay part and the outer part and is made of a second plastic for the interlocked and/or materially-bonded connection of the inlay part and the outer part.

The volume of the outer part of the second spur gear having the gear rim is substantially less in comparison to known spur gears made of plastic, and therefore the volume of the first plastic used for the outer part can be substantially reduced. The possibility results therefrom of using a high-quality and, accompanying this, frequently also expensive plastic as the first plastic, without the total costs of the second gear being increased to an unacceptable extent. A plastic which is particularly low-abrasion can be selected for the first plastic. In particular, a nonreinforced plastic can be used. The disadvantage of nonreinforced plastic of the high thermal expansion only comes into consideration within tolerable limits because of the low volume of the outer part.

Because the gear rim of the second spur gear can consist of a different plastic than the connecting part, the second plastic of the connecting part can be selected such that the connecting part is particularly rigid and therefore only deforms to a small extent in the axial direction. Furthermore, a plastic which has a low thermal expansion can be selected for the first plastic.

It is clear from the above explanations that because of the fact that the gear rim and the connecting part can consist of different plastics, the plastics can be selected optimally for the respective task. While in particular a high axial rigidity and a low thermal expansion with a use of a cost-effective plastic at the same time are in the foreground in particular for the connecting part, a low-abrasion engagement is in the foreground for the gear rim. The proposed design of the second spur gear enables a low-noise gearwheel pair to be specified even in the case of high mechanical loads and temperature variations, which has improved engagement and less wear in comparison to known solutions.

In a refining embodiment, the injection-molded portions are overlapped by the connecting part. The arrangement of the injection-molded portions on the outer part such that they are overlapped by the connecting part results in a good distribution of the liquefied plastic during the production of the outer part, and therefore the outer part is made very homogeneous and the formation of cavities and/or vacuoles is suppressed.

According to a further embodiment, the connecting part has undercuts at least along an axis of rotation of the spur gear. The undercuts formed along the axis of rotation have the result that the molds of the injection-molding tool cannot be opened without the use of gates along the axis of rotation. In order to nonetheless be able to produce the proposed spur gear or the proposed gearwheel pair cost-effectively, firstly the outer part is molded, which has projections facing radially inward and/or radially outward. The projections can be designed such that no undercuts arise and therefore gates are not required during the injection-molding procedure.

According to a further embodiment, the second spur gear has a spur gear diameter and the inlay part has an inlay part diameter, wherein the ratio between the inlay part diameter and the spur gear diameter is between 0.1 and 0.8 and in particular between 0.1 and 0.5. The pitch circle diameter of the second spur gear can be used as the spur gear diameter. As is apparent from DE 103 43 400 A1, the inlay part is very large in known spur gears and has an inlay part diameter which is typically significantly greater than half of the spur gear diameter. The proposed option of reducing the inlay part diameter to values less than 0.5 times the spur gear diameter results in a significant weight reduction of the spur gear.

In a refining embodiment, the first spur gear can have a first width and the second spur gear can have a second width, wherein the first width is greater than the second width. This embodiment suggests itself in particular if the first spur gear or at least the gear rim of the first spur gear consists of metal. As a result of the greater width of the first spur gear, the sharp front edge of the gear rim, which is made of metal, of the first spur gear is prevented from running into the gear rim made of the first plastic and thus resulting in increased wear.

In a refining embodiment, the first spur gear and the second spur gear can each have a helix angle of between 10° and 30°. The helical gearing implemented in this way effectuates better quiet running, since the engagement of the spur gears runs more uniformly and more teeth are engaged simultaneously. However, axial forces arise in the case of the helical gearing, which push the spur gears laterally away from one another and therefore deform them. These axial forces can be safely absorbed with a corresponding selection of the second plastic for the connecting part, however, and therefore the second spur gear experiences no or only minor axial deformations, and therefore misalignments do not occur.

In a further embodiment, the connecting part can have reinforcements to enhance the axial rigidity. This embodiment suggests itself in particular in the case of helical gearings. The reinforcements can be implemented, for example, in the form of ribs or in the form of fibers. The enhanced axial rigidity reduces the axial deformations, and therefore misalignments as a result of axial deformations can be kept small.

According to a refining embodiment, the first plastic is a high-performance thermoplastic or an industrial thermoplastic and/or the second plastic is a high-performance thermoplastic, an industrial thermoplastic, or a thermoset plastic. As already mentioned at the outset, the outer part having the gear rim is subjected to a high level of wear, which can be counteracted particularly effectively using high-performance thermoplastics, without the high-performance thermoplastics having to be fiber reinforced. In particular the partially-crystalline high-performance thermoplastics of the family of polyarylether ketones (PAEK) such as PEK (polyether ketone), PEEK (polyetherether ketone), or PEKK (polyetherketone ketone) are particularly suitable as high-performance thermoplastics. PPS (polyphenylene sulfide) or PPA (polyphthalamide) are also suitable. The second plastic can also be a high-performance thermoplastic, and therefore embodiments are also conceivable in which the connecting part and the outer part are manufactured from the same plastic. In this case, however, it suggests itself that the second plastic, from which the connecting part is manufactured, be embodied as fiber-reinforced in order to enhance the axial rigidity. The use of fiber-reinforced plastics for the outer part having the gear rim is disadvantageous insofar as in this way increased wear would result on the gear rim and fiber abrasion or fiber fracture can occur. In particular if the second plastic of the connecting part is fiber-reinforced, lower-quality and thus more cost-effective plastics such as industrial thermoplastics, for example, partially-crystalline thermoplastic such as PET (polyethylene terephthalate), PA (polyamide), or POM (polyoxymethylene) can also be used. Thermoset plastics such as polyester can also be used.

In a further embodiment, the first spur gear is constructed precisely like the second spur gear. As a result, in this embodiment the first spur gear also has an outer part having a gear rim made of a first plastic, an inlay part made of metal, and a connecting part, which is arranged between the inlay part and the outer part and is made of a second plastic for the interlocked and/or materially-bonded connection of the inlay part and the outer part. The technical effects which have been described for the second spur gear also apply for the first spur gear in this embodiment. The technical effects are therefore added together.

One embodiment of the present disclosure relates to a spur gear unit, comprising a gearwheel pair according to any one of the preceding embodiments, wherein the first spur gear is connected to a driveshaft and the second spur gear is connected to an output shaft or vice versa and the first spur gear meshes with the second spur gear. One property to be mentioned of spur gear units is the parallel but offset arrangement of driveshaft and output shaft. The technical effects and advantages which may be achieved using the proposed spur gear unit correspond to those which have been explained for the proposed gearwheel pair. In summary, it is to be noted that the proposed design of the spur gear unit enables low-noise running to be provided even in the event of high mechanical loads and temperature variations. Furthermore, an improved engagement in comparison to known solutions and less wear can be achieved.

In a further embodiment, the spur gear unit can have a profile overlap between 1 and 2. The profile overlap indicates how many tooth pairs are statistically engaged simultaneously. In order to ensure a continuous transmission of the torque, the degree of overlap has to be at least 1. If the value of the degree of overlap is between 1 and 2, a continuous transmission of the torque can be ensured.

In a refining embodiment, the spur gear unit has an overlap ratio having the values 0 or 1 or 2. In particular the values 1 and 2 for the overlap ratio are to be seen in the context of the manufacturing accuracies, and therefore the values 1 and 2 may only be implemented approximately in practice. The overlap ratio is a measure of how far the gearwheel rotates further between the engagements at one front edge and from the opposing front edge. In the case of a linear gearing, an overlap ratio of 0 results, while at a value of 1, the situation results that the following tooth pair begins to disengage when the engagement of the prior tooth pair has ended. At a value of 2, a gearwheel pair begins to disengage when the tooth pair before the previous one has just completely disengaged and its engagement is ended. In this case, a particularly low impact and smooth running of the spur gear unit results.

One embodiment of the present disclosure relates to the use of a spur gear for spur gear units, wherein the spur gear comprises an outer part having a gear rim made of a first plastic and having a number of injection-molded portions, an inlay part made of metal, and a connecting part, which is arranged between the inlay part and the outer part and is made of a second plastic for the interlocked and/or materially-bonded connection of the inlay part and the outer part, wherein the injection-molded portions are overlapped by the connecting part.

Furthermore, the present disclosure relates to the use of a spur gear for spur gear units, wherein the spur gear comprises an outer part having a gear rim made of a first plastic and having a number of injection-molded portions, an inlay part made of metal, and a connecting part, which is arranged between the inlay part and the outer part and is made of a second plastic for the interlocked and/or materially-bonded connection of the inlay part and the outer part, wherein the connecting part has undercuts at least along an axis of rotation of the spur gear.

The technical effects and advantages which may be achieved by the proposed spur gear correspond to those which have been explained for the present gearwheel pair. In summary, it is to be noted that the proposed use of the spur gear unit enables low-noise running to be provided even in the event of high mechanical loads and high temperatures. Furthermore, an engagement improved in comparison to known solutions and lower wear can be achieved.

A further embodiment of the present disclosure relates to a method for producing a spur gear, wherein the spur gear comprises an outer part having a gear rim made of a first plastic, an inlay part made of metal, and a connecting part, which is arranged between the inlay part and the outer part and is made of a second plastic for the interlocked and/or materially-bonded connection of the inlay part and the outer part and the method has the following step:

injection molding the outer part while forming a number of injection-molded portions and injection molding the connecting part between the outer part and the inlay part such that the injection-molded portions are overlapped by the connecting part.

A further embodiment of the present disclosure relates to a method for producing a spur gear, wherein the spur gear comprises an outer part having a gear rim made of a first plastic, an inlay part made of metal, and a connecting part, which is arranged between the inlay part and the outer part and is made of a second plastic for the interlocked and/or materially-bonded connection of the inlay part and the outer part and the method has the following step:

injection molding the outer part while forming a number of injection-molded portions and injection molding the connecting part between the outer part and the inlay part such that the connecting part has undercuts at least along an axis of rotation of the spur gear.

As already explained, in spur gear units, the gearwheels are loaded both about their axis of rotation and also along their axis of rotation. In order to ensure a transmission of the forces and torques between the outer part and the connecting part without slipping, depressions are provided, in which corresponding projections engage, and therefore an interlocked connection is provided between the outer part and the connecting part. In order that the interlocked connection can prevent slipping of the outer part and the connecting part in relation to one another both along the axis of rotation and also about the axis of rotation, the depressions and projections have to be shaped appropriately. To provide an interlocked connection and prevent the slipping both along and also about the axis of rotation, undercuts arise on at least one part, and therefore the relevant part cannot be molded, in particular injection molded, without gates, which makes the injection molding procedure complex and thus costly.

In order to be able to nonetheless produce the proposed spur gear cost-effectively, firstly the outer part is molded, which has a number of depressions, which can be delimited radially inward. The depressions can also be embodied as boreholes and can be designed such that no undercuts arise and therefore no gates are required during the injection molding procedure.

Subsequently, the connecting part is injected between the outer part and the inlay part, wherein the outer part is used as a shaping element in particular for the projections of the connecting part. Since the outer part and the connecting part are supposed to be connected to one another in any case, demolding is not necessary, because of which no gates are required, even if the connecting part has undercuts. The proposed spur gear can therefore be produced cost-effectively.

Because of the fact that firstly the outer part and then the connecting part are injection molded, the proposed method enables the cost-effective production of the present spur gear. Since the outer part is injection molded, it has the injection-molded portions. It is unimportant whether the step of providing the inlay part is carried out before or after the injection molding of the outer part. It is decisive that the step of the injection molding of the outer part takes place before the injection molding of the connecting part. The advantage not only results in this way that a gate can be omitted during the injection molding, but rather also that the outer part which bears the gear rim remains free of tensions which are introduced into the outer part if the connecting part is injection molded first and subsequently the outer part is injection molded. Because of the location of the injection-molded portions in the outer part, the liquefied plastic can be distributed well, and therefore the outer part can be manufactured very homogeneously and free of cavities and vacuoles.

The probability of a fracture of a tooth or other damage of the gear rim is thus reduced.

The connecting part can be injection molded using, for example, the disk gate method or the pinpoint gate method. In the disk gate method, the injection-molded portions typically form as a coherent injection-molded surface, while in the pinpoint gate method, the injection-molded portions form as a number of injection-molded points. The disk gate method has the advantage that the connecting part can be manufactured without weld seams and with a very high concentric running accuracy. In principle, the disk gate method results in a more or less strongly pronounced excess, which has to be removed by cutting in a further method step. Since the plastic melt is injected via a centrally arranged injection molding channel in the disk gate method, a disk-shaped tool insert has to be used to prevent the plastic melt from penetrating into the cavity enclosed by the inlay part. The manufacturing becomes complex and thus more expensive in this way.

In the pinpoint gate method, the plastic is injected through a number of injection-molding channels, which are typically arranged concentrically around the inlay part, into the intermediate space between the outer part and the inlay part. The connecting part produced in this way does have weld seams, but no excess is present, which has to be removed in a further work step. Furthermore, a disk-shaped tool insert is not required. The pinpoint gate method is thus more cost-effective in comparison to the disk gate method.

BRIEF DESCRIPTION OF DRAWINGS

Exemplary embodiments of the present application will be explained in greater detail hereafter with reference to the appended drawings. In the figures FIG. 7a shows a top view of a second spur gear after the demolding from the injection-molding tool, FIG. 7b shows a schematic sectional illustration through an injection-molding tool for producing a second spur gear according to the present application in the disk gate method using the section plane A-A defined in FIG. 7a, FIG. 7c shows a perspective illustration of a second spur gear after the demolding from the injection molding tool, FIG. 8 shows a schematic illustration to explain the pinpoint gate method.

DETAILED DESCRIPTION

Figure 1:
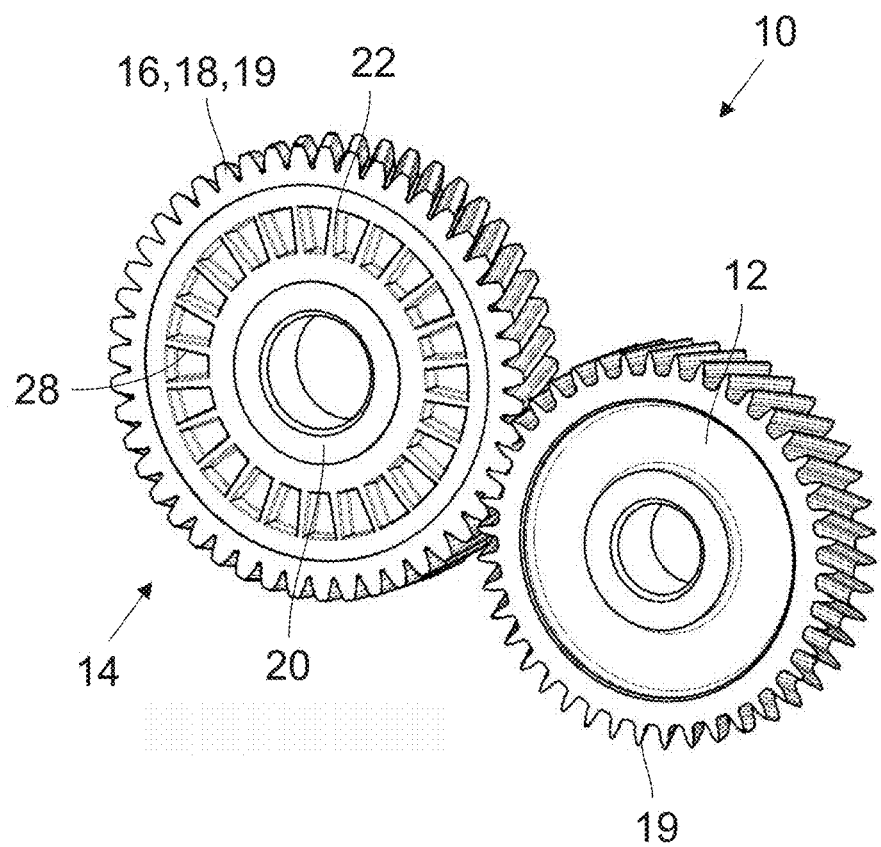
FIG. 1 shows a perspective illustration of one embodiment of a gearwheel pair according to the present application.

FIG. 1 shows an exemplary embodiment of a gearwheel pair 10 according to the present disclosure on the basis of a perspective illustration. The gearwheel pair 10 comprises a first spur gear 12 and a second spur gear 14, which are meshed. The first spur gear 12 is completely produced from one material in this case, for example, from plastic or from metal. The second spur gear 14 has an outer part 16, which forms a gear rim 18 having a number of teeth 19, an inlay part 20, and a connecting part 22 arranged between the inlay part 20 and the outer part 16. The connecting part 22 connects the inlay part 20 and the outer part 16 in an interlocked and/or materially-bonded manner.

The outer part 16 is manufactured from a first plastic and the connecting part 22 is manufactured from a second plastic, while the inlay part 20 consists of metal. The inlay part 20 can be formed as a hub, shaft, or a preinstalled functional assembly.

An embodiment in which the first spur gear 12 is constructed precisely like the second spur gear 14 is not shown, and therefore the first spur gear 12 also has the outer part 16, the inlay part 20, and the connecting part 22.

Figure 2:
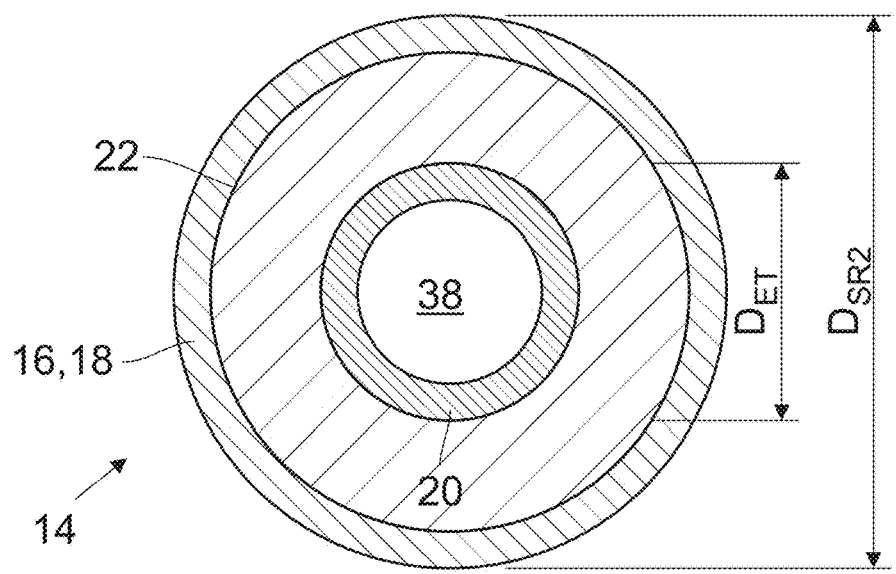
FIG. 2 shows a schematic sectional illustration through a second spur gear according to the present application.

In FIG. 2, an embodiment of the second spur gear 14 is shown on the basis of a schematic sectional illustration. The second spur gear 14 has a spur gear diameter $D_{SR2}$, while the inlay part 20 has an inlay part diameter $D_{ET}$. The ratio between the inlay part diameter $D_{ET}$ and the spur gear diameter $D_{SR2}$ is between 0.1 and 0.8. In the illustrated example, the ratio is approximately 0.46.

Figure 3:
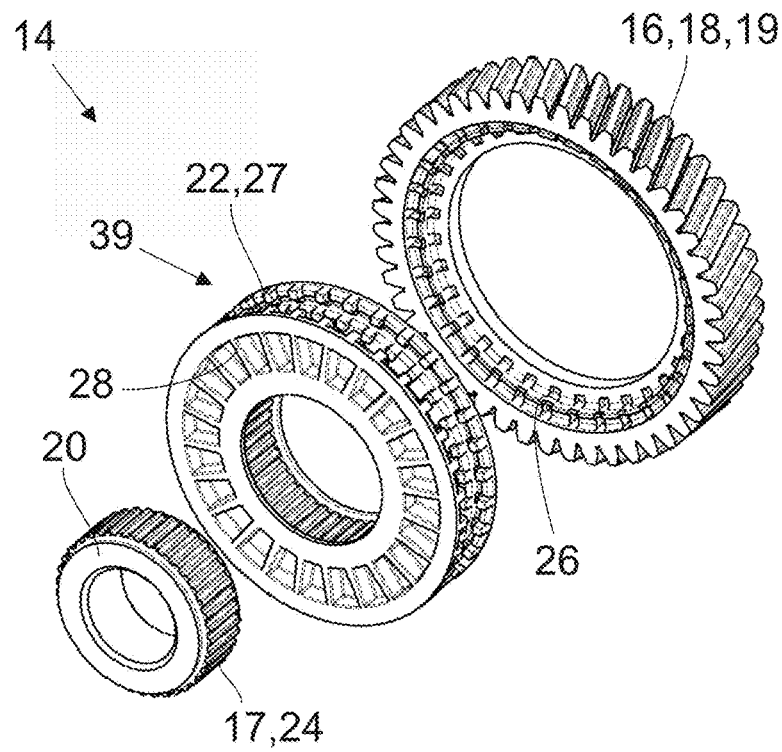
FIG. 3 shows a perspective, exploded illustration through a second spur gear according to the present application.

In FIG. 3, the second spur gear 14 illustrated in FIG. 1 is shown on the basis of a perspective exploded illustration. It can be seen that the inlay part 20 has recesses 17, for providing interlocking with the connecting part 22, on its outer lateral surface 24, with which it comes into contact with the connecting part 22. The connecting part 22 is formed corresponding to the recesses 17 where the connecting part 22 comes into contact with the inlay part 20.

It can be seen both from FIG. 3 and in particular from FIGS. 4a to 4e that the outer part 16 has a number of depressions 29 delimited radially inward, to produce an interlock with the connecting part 22, on its inner lateral surface 26, with which it comes into contact with the connecting part 22. The connecting part 22 has corresponding hooked projections 27. As already explained, the interlock between the outer part 16 and the connecting part 22 has to be designed such that slipping of the outer part 16 in relation to the connecting part 22 is prevented both along and also about the axis of rotation T of the second spur gear 14 (see FIG. 9). It is clear in particular from FIGS. 4d and 4e that as a result of this requirement, the projections 27 are shaped such that they form undercuts 39, which are not producible without the use of a gate in the injection molding method.

Figure 4A:
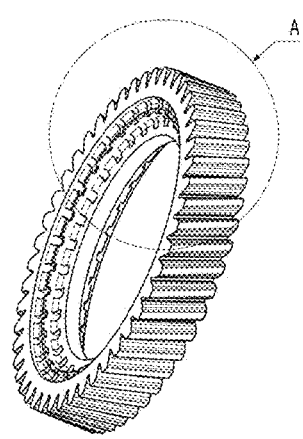
FIG. 4a shows a perspective illustration of the outer part of the second spur gear.
Figure 4B:
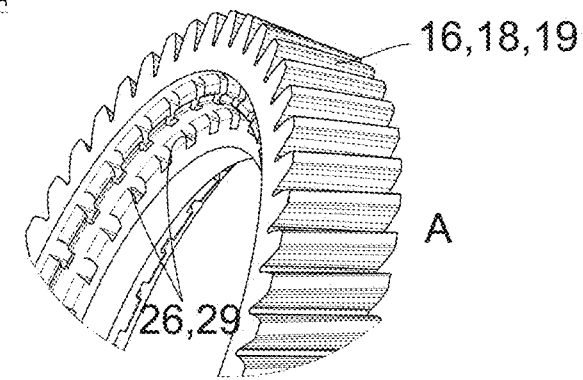
FIG. 4b shows an enlarged illustration of the detail A identified in FIG. 4a, FIG. 4c shows a perspective illustration of the connecting part of the second spur gear.
Figure 4C:
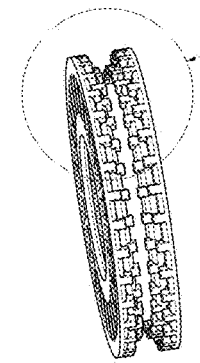
FIG. 4d shows an enlarged illustration of the detail B identified in FIG. 4c.
FIG. 4e shows a schematic sectional illustration through the connecting part of the detail C identified in FIG. 4d, FIGS. 5a-5b each show a schematic unrolling of the outer part.
Figure 4D:
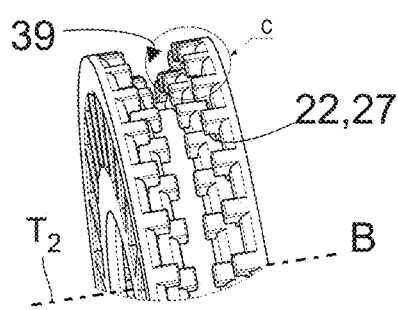
Figure 4E:
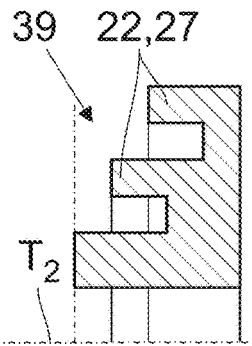

To be able to illustrate this situation more accurately, FIG. 4e shows a schematic illustration in partial section through the connecting part 22, wherein the plane of section extends through the axis of rotation $T_2$ of the second spur gear 14. It can be seen in particular from FIG. 4e that the projections 27 are arranged on two different planes, which each have a different diameter and which are arranged offset in relation to the axis of rotation $T_2$. The depressions 29 of the outer part 16 are designed accordingly. Both the outer part 16 and also the connecting part 22 therefore have a stepped construction. As a result of the arrangement of the projections 27 and the depressions 29, the number of the projections 27 and the depressions 29 can be increased, and therefore the above-described slipping of the outer part 16 in relation to the connecting part 22 can be prevented particularly effectively.

It is clear in particular from FIGS. 4c to 4e that the connecting part 22 not only has an undercut 39 along the axis of rotation $T_2$, but rather also perpendicular to the axis of rotation $T_2$.

Furthermore, it is recognizable from FIG. 3 that the connecting part 22 has reinforcements 28 in the form of ribs, using which the axial rigidity can be enhanced with little material use.

Figure 5A:
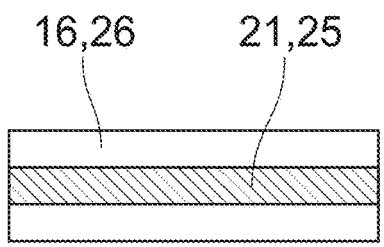
Figure 5B:
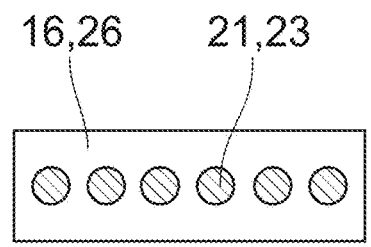

A schematic unrolling of the outer part 16 is shown in each of FIGS. 5a and 5b, wherein the view is toward the inner lateral surface 26 of the outer part. The exemplary embodiment of the outer part 16 illustrated in FIG. 5a has an injection-molded portion 21, which is formed in the form of a coherent injection-molded surface 25. As will be explained in greater detail hereafter, for the case in which the outer part 16 is produced in the disk gate method, after completion of the disk gate method, an excess arises which has to be removed by cutting, for example, in a separate method step. As a result of the removal of the excess, the injection-molded surface 21 results, which differs in its quality from the other surfaces of the outer part 16 which are not treated accordingly.

The exemplary embodiment of the outer part 16 illustrated in FIG. 5b has a number of injection-molded portions 21, which are formed in the form of multiple injection-molded points 23. The injection-molded points 23 arise if the pinpoint gate method is used where the injection-molding channels of the injection-molding tool end and discharge into the cavity of the tool.

Figure 6A:
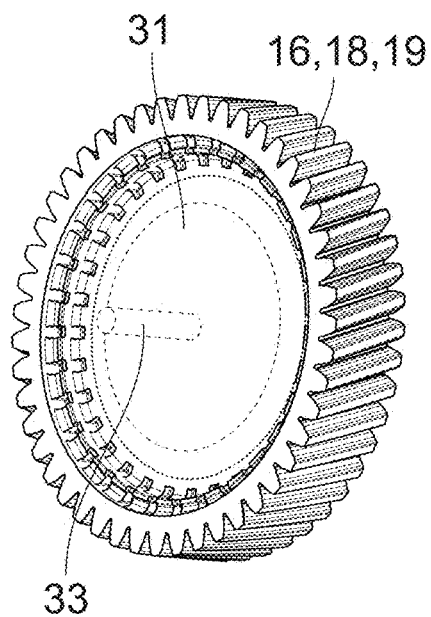
FIGS. 6a-6c show various schematic illustrations of the injection molding method for producing the outer part of the second spur gear: a: disk gate, b: radial star gate, frontal pinpoint gate
Figure 6B:
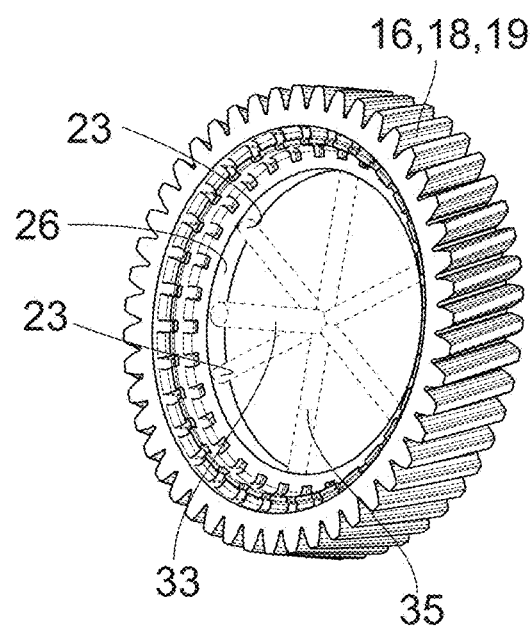
Figure 6C:
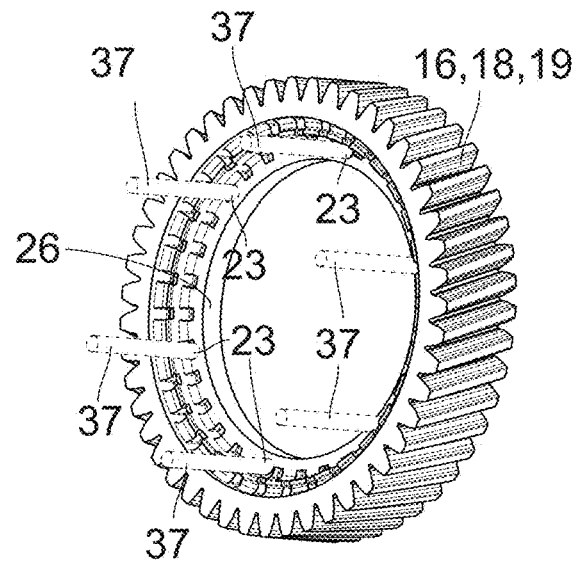

Various embodiments of the injection-molding method for producing the outer part 16 are shown on the basis of schematic illustrations in FIGS. 6a to 6c. FIG. 5a shows a disk gate, in which a tool insert 31 is used to produce the outer part 16. The tool insert 31 is enclosed by the upper tool (not shown) and by the lower tool (not shown).

In the star gate method illustrated in FIG. 6b, the tool insert 31 has a main injection-molding channel 33 extending along the axis of rotation of the outer part 16, which discharges into a total of six subchannels 35 extending in a star shape and perpendicularly to the axis of rotation.

In FIG. 5c, a total of six injection-molding channels 37 are provided, which are arranged on the relevant upper or lower tool and extend parallel to the axis of rotation. This is a point gating method in this case.

In both cases, where the subchannels 35 or the injection-molding channels 37, respectively, end and discharge into the cavity, the injection-molding points 23 also illustrated in FIGS. 2 and 5b form in the resulting outer part 16. Depending on the course of the subchannels 35 and the injection-molding channels, the injection-molding points 23 are arranged on the inner lateral surface 26 (FIG. 6b or on the end face of the outer part 16 (FIG. 6c).

FIG. 7a shows a schematic sectional illustration through an injection-molding tool 30 for producing a second spur gear 14 according to the present disclosure in the disk gate method. The already finished inlay part 20 and the also finished outer part 16 are laid on a bottom 32 of the injection-molding tool 30 concentrically to a tool axis A.

The injection-molding tool 30 has an upper tool 34 having a conical portion, which is movable along the tool axis A. Concentrically to the tool axis A, the upper tool 34 has an injection-molding channel 36, through which a plastic melt can be introduced into the interior of the injection-molding tool 30.

To produce the connecting part 22, the upper tool 34 is closed until it rests on the outer part 16. The plastic melt is subsequently injected into the interior of the injection-molding tool 30. To prevent the plastic melt from penetrating into a cavity 38 enclosed by the inlay part 20 (cf. FIG. 2), a tool insert 40 is inserted into the cavity 38, which fills it up completely and protrudes out of it, before the closing of the tool. The tool insert 40 is typically concentrically connected to the bottom 32.

FIG. 7b shows the second spur gear 14 in a perspective illustration after the demolding from the injection-molding tool 30. It can be seen that the connecting part 22 has a conical excess 42, which has to be removed in a cutting work step.

FIG. 8 shows a schematic illustration to depict the pinpoint gate method. In the pinpoint gate method, the plastic melt is injected through a number of injection-molding channels 36, which are typically arranged concentrically around the inlay part 20, into the intermediate space between the outer parts 16 and the inlay part 20. In the illustrated example, three injection-molding channels 36 are provided. Weld seams 44 arise where the flow fronts of the plastic melts, which have been injected through adjacent injection-molding channels 36 into the intermediate space, meet one another. In contrast to the disk gate method, a tool insert 40 is not necessary to prevent the plastic melt from reaching the cavity 38 enclosed by the inlay part 20. The upper tool 34 can be designed such that it can be closed extensively until it rests both on the inlay part 20 and also on the outer part 16. No excess 42 which has to be removed after the demolding results.

Figure 9:
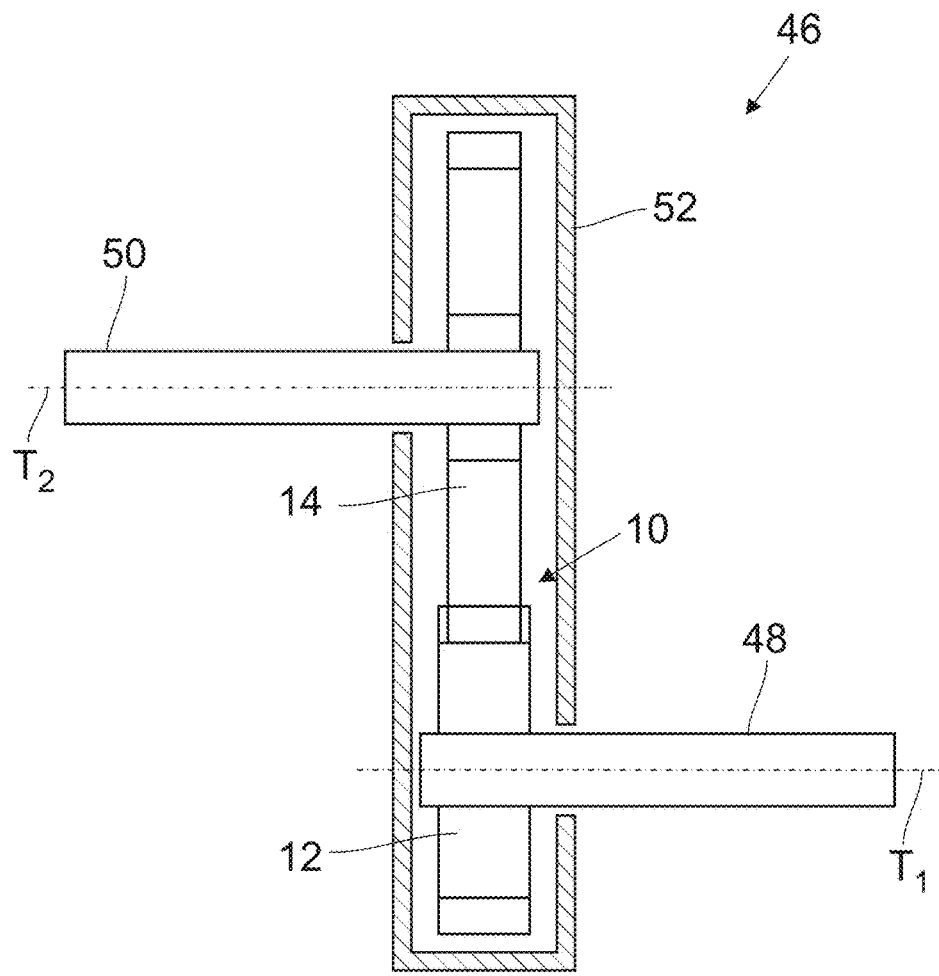
FIG. 9 shows a schematic illustration of a spur gear unit having a gearwheel pair according to the present application.

FIG. 9 shows a schematic illustration of a spur gear unit 46 having a gearwheel pair 10 according to the present disclosure. The first spur gear 12 is connected in a rotationally-fixed manner to a driveshaft 48 rotatable about a first axis of rotation $T_1$ and the second spur gear 14 is connected in a rotationally-fixed manner to an output shaft 50 rotatable about a second axis of rotation $T_2$. The driveshaft 48 and the output shaft 50 extend parallel but offset in relation to one another. The first spur gear 12 and the second spur gear 14 are arranged meshing in an interior of a gearing housing 52. The driveshaft 48 and the output shaft 50 are supported in a way not shown in greater detail. The connecting part 22 is manufactured from a material which is adapted to the thermal expansion of the gearing housing 52 and the first spur gear 12. The goal in this case is to design the gearing housing 52 in such a way that the thermal expansion of the gearing housing 52 is approximately equal to the total of the thermal expansions of the two spur gears 12, 14 of the gearwheel pair 10, in order to minimize the occurrence of excessively large or excessively small tooth clearance and the negative effects accompanying this on the engagement of the two spur gears 12, 14.

Figure 10:
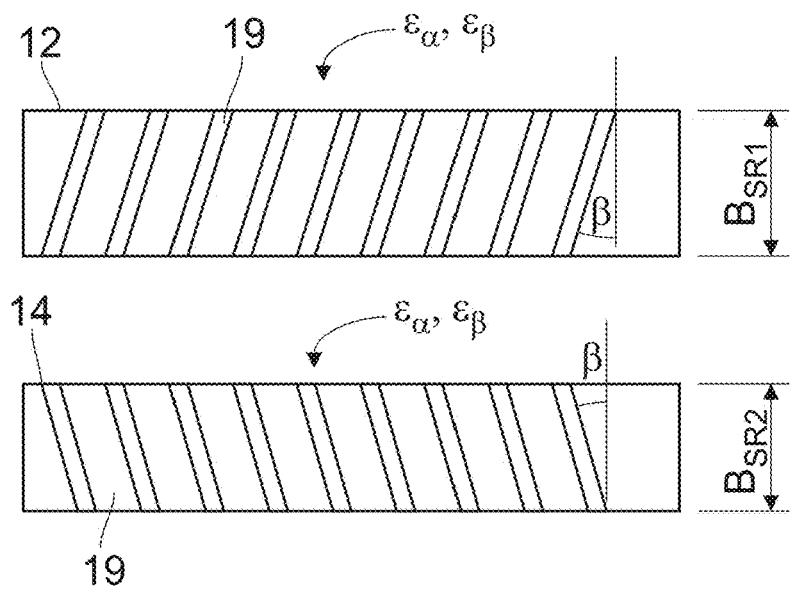
FIG. 10 shows a schematic unrolling of the gear rims of the first and the second spur gear.

The first spur gear 12 and the second spur gear 14 are shown on the basis of a schematic unrolling in FIG. 10. The first spur gear 12 has a first width $B_{SR1}$ and the second spur gear 14 has a second width $B_{SR2}$. The first width $B_{SR1}$ is greater than the second width $B_{SR2}$, which prevents the sharp front edge of the gear rim, in particular made of metal, of the first spur gear 12 from running into the gear rim 18 made of the first plastic and thus resulting in increased wear. As is also recognizable from FIGS. 1 and 3, the gearwheel pair 10 has a helical gearing, and therefore the first spur gear 12 and the second spur gear 14 have a helix angle β, which is between 10° and 30° and is approximately 20° in the illustrated example. A profile overlap $\varepsilon_\alpha$, which is between 1 and 2, results from the profile (not shown in greater detail) of the teeth 19. In particular as a result of the selected helix angle β, an overlap ratio $\varepsilon_\beta$ results, which is to have a value of 1 or 2 in the present case.

LIST OF REFERENCE SIGNS 10 gearwheel pair
12 first spur gear
14 second spur gear
16 outer part
17 recess
18 gear rim
19 tooth
20 inlay part
21 injection-molded portion
22 connecting part
23 injection-molded point
24 outer lateral surface
25 injection-molded surface
26 inner lateral surface
27 projection
28 reinforcement
29 depression
30 injection-molding tool
31 tool insert
32 bottom
33 main injection-molding channel
34 upper tool
35 lower channel
36 injection-molding channel
37 injection-molding channel
38 cavity
39 undercuts
40 tool insert
42 excess
44 weld seams
46 spur gear unit
48 driveshaft
50 output shaft
52 gearing housing
A tool axis
$b_{SR1}$ first width
$b_{SR2}$ second width
$d_{SR2}$ spur gear diameter
$d_{ET}$ inlay part diameter
$T_1$ first axis of rotation
$T_2$ second axis of rotation
β helix angle
$\varepsilon_\alpha$ profile overlap
$\varepsilon_\beta$ overlap ratio

What is claimed:

1. A gear, comprising:
an outer part having a gear rim made of a first plastic and having a number of injection-molded portions,
an inlay part made of metal, and
a connecting part made of a second plastic, the connecting part arranged between the inlay part and the outer part for an interlocked and/or materially-bonded connection between the inlay part and the outer part,
wherein the outer part has a plurality of depressions that mate to a plurality of corresponding projections of the connecting part, and wherein the plurality of depressions and corresponding projections are interlocked when mated,
wherein the connecting part overlaps the injection-molded portions, and the connecting part has undercuts acting at least along and perpendicular to an axis of rotation of the gear, wherein acting at least along and perpendicular to the axis of rotation of the gear prevents movement of the outer part relative to the connecting part along and perpendicular to the axis of rotation, and
wherein the plurality of corresponding projections comprise adjacent projections, and a projection has a length along the axis of rotation that is different than a length along the axis of rotation of an adjacent projection, and
wherein the plurality of depressions of the outer part comprise adjacent depressions, and a depression has a depth along the axis of rotation that is different than a depth along the axis of rotation of an adjacent depression.

2. The gear as claimed in claim 1, wherein the plurality of corresponding projections are in stepped configuration with each adjacent projection having an increased length along the axis of rotation in a direction starting from an outermost projection to an inner most projection.

3. The gear as claimed in claim 2, wherein the plurality of depressions are in stepped configuration with each adjacent depression having an increased depth along the axis of rotation in a direction starting from an outermost depression to an inner most depression.

4. A gearwheel pair for a gear unit, comprising:
a first gear, and
a second gear, which can be arranged to mesh with the first gear,
wherein the first gear consists entirely or partially of metal or plastic, and
the second gear comprises:
an outer part having a gear rim made of a first plastic and having a number of injection-molded portions,
wherein the outer part has a plurality of depressions that mate to a plurality of corresponding projections of the connecting part, and wherein the plurality of depressions and corresponding projections are interlocked when mated,
an inlay part made of metal, and
a connecting part made of a second plastic, the connecting part arranged between the inlay part and the outer part for an interlocked and/or materially-bonded connection between the inlay part and the outer part, and the connecting part has undercuts acting at least along and perpendicular to an axis of rotation of the second gear, wherein acting at least along and perpendicular to the axis of rotation of the gear prevents movement of the outer part relative to the connecting part along and perpendicular to the axis of rotation, and
wherein the plurality of corresponding projections comprise adjacent projections, and a projection has a length along the axis of rotation that is different than a length along the axis of rotation of an adjacent projection, and
wherein the plurality of depressions of the outer part comprise adjacent depressions, and a depression has a depth along the axis of rotation that is different than a depth along the axis of rotation of an adjacent depression.

5. The gearwheel pair as claimed in claim 4, wherein the second gear has a second gear diameter and the inlay part has an inlay part diameter, and
wherein a ratio between the inlay part diameter and the second gear diameter is between 0.1 and 0.8.

6. The gearwheel pair as claimed in claim 4, wherein the first gear has a first face width and the second gear has a second face width, and
wherein the first face width is greater than the second face width.

7. The gearwheel pair as claimed in claim 4, wherein the first gear and the second gear each have a helix angle of between 10° and 30°.

8. The gearwheel pair as claimed in claim 4, wherein the connecting part has reinforcements to enhance the axial rigidity.

9. The gearwheel pair as claimed in claim 4,
wherein the first plastic is a partially crystalline high-performance thermoplastic of the family of polyaryle-ther ketones (PAEK), PPS (Polyphenylensulfid), or PPA (Polyphthalamid), and the second plastic differs from the first plastic in the mechanical properties and/or chemically.

10. The gearwheel pair as claimed in claim 4, wherein the first gear is connected to a driveshaft and the second gear is connected to an output shaft or wherein the second gear is connected to the driveshaft and the first gear is connected to the output shaft and the first gear meshes with the second gear.

11. The gearwheel pair as claimed in claim 10, further comprising a profile overlap between 1 and 2.

12. A method, comprising:
producing a gear, wherein the gear comprises:
an outer part having a gear rim made of a first plastic,
an inlay part made of metal, and
a connecting part made of a second plastic, which is arranged between the inlay part and the outer part for an interlocked and/or materially-bonded connection between the inlay part and the outer part,
the first plastic is a high-performance thermoplastic or an industrial thermoplastic and/or the second plastic is a high-performance thermoplastic, an industrial thermoplastic, or a thermoset plastic, and
injection molding the outer part while forming a number of injection-molded portions, and
wherein the outer part has a plurality of depressions that mate to a plurality of corresponding projections of the connecting part, and wherein the plurality of depressions and corresponding projections are interlocked when mated,
injection molding the connecting part between the outer part and the inlay part such that the connecting part overlaps the injection-molded portions and such that the connecting part has undercuts acting at least along and perpendicular to an axis of rotation of the gear, wherein acting at least along and perpendicular to the axis of rotation of the gear prevents movement of the outer part relative to the connecting part along and perpendicular to the axis of rotation, and
wherein the plurality of corresponding projections comprise adjacent projections, and a projection has a length along the axis of rotation that is different than a length along the axis of rotation of an adjacent projection, and
wherein the plurality of depressions of the outer part comprise adjacent depressions, and a depression has a depth along the axis of rotation that is different than a depth along the axis of rotation of an adjacent depression.

13. The method as claimed in claim 12, further comprising:
forming undercuts in the connecting part collinear with the axis of rotation of the gear.

14. The method as claimed in claim 12, wherein injection molding the outer part is carried out using a pinpoint gate method.

15. A gear for use in a gear unit, comprising:
an outer part having a gear rim made of a first plastic and having a number of injection-molded portions,
an inlay part made of metal, and
a connecting part made of a second plastic, the connecting part arranged between the inlay part and the outer part for a connection between the inlay part and the outer part,
wherein the outer part has a plurality of depressions that mate to a plurality of corresponding projections of the connecting part, and wherein the plurality of depressions and corresponding projections are interlocked when mated,
wherein the connecting part overlaps the injection-molded portions, and the connecting part has undercuts acting at least along and perpendicular to an axis of rotation of the gear, wherein acting at least along and perpendicular to the axis of rotation of the gear prevents movement of the outer part relative to the connecting part along and perpendicular to the axis of rotation, and
wherein the plurality of corresponding projections comprise adjacent projections, and a projection has a length along the axis of rotation that is different than a length along the axis of rotation of an adjacent projection, and
wherein the plurality of depressions of the outer part comprise adjacent depressions, and a depression has a depth along the axis of rotation that is different than a depth along the axis of rotation of an adjacent depression.

\* \* \* \* \*